United States Patent Office 3,248,288
Patented Apr. 26, 1966

3,248,288
LOW WEATHERING RATE SOLID PEST CONTROL COMPOSITION AND METHOD
Charles R. Wilder and Robert C. Wheat, Bartlesville, Okla., assignors to Phillips Petroleum Company, a corporation of Delaware
No Drawing. Filed Apr. 30, 1963, Ser. No. 276,980
11 Claims. (Cl. 167—42)

This invention relates to a low weathering rate solid pest control composition. It also relates to a method for producing a low weathering rate solid pest control composition. In one of its aspects, the invention relates to a method for the production of pest control, e.g., insecticidal or nematocidal, compositions having long active life by admixing a major amount of a hydrocarbon solution of a pest control material with a minor amount of a polymeric material having the property of forming with the solution, upon cooling, a solid form stable product. In another of its aspects, the invention relates to a method for the production of a form stable solid pest control composition comprising a pest control ingredient, a hydrocarbon and a polymer of a hydrocarbon by admixing a pest control ingredient, a hydrocarbon solvent and a normally solid hydrocarbon polymer such as a trans-diene polymer, a resinous polymer of a 1-olefin, e.g., polyethylene, polypropylene, poly-1-butene and the like. In a further aspect of the invention, it relates to compositions produced as herein described.

One of the problems encountered in the control of pest or insect infestation lies in the relatively rapid loss of the pest control or pesticidal agents from weathering effects which necessitates frequent retreatment of infested areas.

We have now conceived of new solid insecticidal compositions and method for making same by dissolving a minor amount of a polymer or polymeric material as herein described or a functional equivalent thereof into a major amount of a hydrocarbon solution of a pest control and then cooling to obtain a form stable solid, as more fully described herein. Thus, new solid pest controlling compositions can be prepared having significantly extended active life by which means the problem of frequent retreatment to realize effective pest control is substantially relieved. The compositions of the invention are prepared by dissolving a minor amount, generally from about 5 to about 35 parts by weight, or somewhat more, say 40 parts, of a polymeric material such as a trans-polydiene, a polymer of a 1-olefin, or a mixture thereof per 100 parts by weight of the total composition in a hydrocarbon solution of pest control ingredient. By the term "total composition" we mean the mixture of polymeric material, liquid hydrocarbon, and pest control ingredient. The compositions thus prepared are form stable solids which can be handled with ease as compared with liquid pest control materials heretofore employed.

It is an object of this invention to prepare a low weathering rate solid pest control composition. It is a further object of this invention to provide a method for the preparation of a low weathering rate solid pest control composition. It is a further object of this invention to prepare solid form stable low weathering rate pest control compositions which release for pest control the effective pesticidal or pest control ingredient contained therein. It is another object of this invention to provide an insect or other pest repellent composition. It is a further object of this invention to provide a readily transportable and storable, form-stable, pest control releasing composition.

Other aspects, objects and the several advantages of the invention are apparent from a study of this disclosure and the appended claims.

According to the present invention, there is provided a method for the preparation of a form stable pest control composition which comprises dissolving a polymeric material in a hydrocarbon solution of a pest control agent, the polymeric material having the property upon standing in said solution of forming a solidified mass therewith. Thus, according to the invention, polymeric materials as herein described are admixed, usually in minor amount, with a major amount of a hydrocarbon solution of a pest control ingredient.

Also according to the invention, there are provided the pest control solid form stable compositions which are produced by the method herein described.

The preferred polymeric component of the compositions of the invention is a trans-polymer of a conjugated diene typified by trans-polybutadiene. Other suitable and now preferred materials include polyethylene, polypropylene, poly-1-butene and the like. Suitable trans-diene polymers include high trans-polybutadiene, high trans-polyisoprene, high trans-polypiperylene, and naturally occurring polymers of high trans-content such as balata and gutta percha. The preferred polymers are trans-polybutadiene and, particularly, polybutadiene having a trans-configuration content greater than about 85 percent. The synthetic high trans-diene polymers are prepared from 1,3-butadiene, isoprene or piperylene using any suitable polymerization procedure by which such structures can be obtained. One convenient process for the production of such polymers involves solution poylmerization of a conjugated diene in the presence of an initiator system comprising lithium aluminum hydride and titanium tetraiodide. Polymers prepared in this manner will generally contain 90 percent or more of polymer formed by trans-1,4-addition, as set forth, described and claimed in U.S. 3,050,513.

According to the invention, normally solid high molecular weight polymers that can be employed include polymers of 1-olefins having from 2 to 8 carbon atoms per molecule. The term "polymers of 1-olefin" include homo-polymers of 1-olefins having from 2 to 8 carbon atoms and copolymers of these 1-olefins with each other. Representative examples of suitable 1-olefins include Ethylene
Propylene
Butene-1
Pentene-1
Hexene-1
Heptene-1
4-methyl-pentene-1
5-methylhexene-1
4,4-dimethylhexene-1
4-ethylhexene-1
Octene-1 and the like. Suitable olefin polymers include variously polymerized ethylenes as well as polypropylene. The preferred polymers are ethylene polymers having a density ranging from 0.93 to 1.00, preferably 0.94 to 0.98. The term "ethylene polymers" includes homopoylmers of ethylene as well as copolymers of ethylene with minor amounts of higher molecular weight monomers copolymerizable therewith such as Propylene
1-butene
1-hexene
Butadiene
Isoprene and the like. The more preferred polymers are polyethylene and particularly polyethylene having an average molecular weight greater than about 100,000 (as determined from viscosity).

The preferred ethylene polymers as described herein can be prepared according to the method described and claimed in Patent No. 2,825,721 to Hogan and Banks. However, the polymers applicable according to the invention can be prepared by any known method so long as the polymers have the above described properties. The ethylene polymers can be prepared by any of the known solution processes as well as the "particle form" process. (Polymerization of 1-olefins is carried out in suspension and below temperature at which any substantial portion of the polymer formed is in solution in the suspending medium.) The "particle form" ethylene polymers ordinarily have an inherent viscosity ranging from 3–10 and a high load melt index ranging from 0.6–10.0. Inherent viscosity is determined by ASTM D 1601–61 except that an Ostwald-Fenske viscometer is used and tetralin is used as solvent. High load melt index is determined by ASTM D 1238–57T, Condition F.

The pest control material employed will be a material which is soluble in the liquid hydrocarbon used. The particular compound employed will be dependent on the pest control activity desired for the area in which the composition is used. When pesticidal activity is desired, malathion, hexachlorobenzene, parathion, aldrin, endrin, dieldrin, and the like are suitable for use in many such applications. Concentration of the pest control agent in the solvent will be from 0.5 to 5.0 percent by weight or higher. Since the action of the agent takes place at the surface of the composition and since the hydrocarbon carrier is a more or less volatile material, the concentration of agent will be higher at the surface of the composition than in the absorbed liquid.

In the preparation of the compositions of the invention the solution of agent in hydrocarbon is first prepared by dissolving the desired amount of active agent therein. This solution is then mixed with the polymeric material at a temperature sufficiently high to provide a homogeneous system, the amount of polymer added being in the range from 5 to 35 parts by weight per hundred parts of total composition. This mixture is poured into a suitable mold and allowed to cool. A firm, form stable unit is thus formed which will retain its insecticidal activity over extended periods of time.

The forms into which the compositions are molded include spheres, cubes, discs, cylinders, cords, and the like. When using trans-polybutadiene, a preferred polymeric material, the insecticidal unit undergoes progressive shrinkage with exposure time and after all the liquid hydrocarbon has been volatilized the residual polymer will occupy from about 5 to about 35 percent of its original volume, thus being inconspicuous at the site where used. In one useful application the composition is made up using a hydrocarbon solution of a nematocide, molded into pellets and incorporating in infested soil by tilling or plowing. By so operating, the active nematocide is fed into the soil at a controlled rate over an extended period, thus providing an effective control for these pests.

When desired, a hydrocarbon pest or insect attractant or repellent, or both, can be incorporated in the compositions of the invention. Thus, in a given situation one pest may be repelled and another attracted and killed.

Liquid hydrocarbons or solvents which can be used to prepare the compositions of the invention are generally well known in the art and include, in addition to that used in the example given herein, saturated and unsaturated acyclic, saturated and unsaturated cyclic, and aromatic hydrocarbons or combinations or mixtures thereof. Paraffinic materials including hexanes, octanes, decanes, pentadecanes, and the like as well as mixtures of these materials are preferred when smokelessness is particularly desirable. Petroleum refinery hydrocarbon fractions such as gasolines, kerosenes, stove oils, furnace oils, gas oils, cycle oils, diesel fuels, crude oils, topped crude, and the like are especially useful in the invention. Hydrocarbon fractions having flash points ranging from atmospheric to about 200° F. are usually preferred. As is well known by those skilled in the art, the flash point of materials flashing above about 175° F. is determined by the Cleveland Open Cup Method, ASTM D 92–57 and those flashing below 175° F. by the Tag Closed Cup Method, ASTM D 56–61. As indicated above, preferred hydrocarbons are those paraffins or largely paraffinic mixtures or isoparaffinic mixtures which boil between about 200 and about 700° F. Still more preferred are those that boil between about 300 and about 500° F. The preferred components or fractions are more convenient in that the preparation of the solid composition can be effected without the necessity for pressure vessels for the heating step.

EXAMPLE

A series of insecticidal compositions was prepared using trans-polybutadiene and solutions containing 2 weight percent malathion made up in n-heptane and Soltrol 170. The polymer was placed in the malathion solution and heated with stirring on a water bath at about 60° C. When a homogeneous solution was obtained, it was poured into a mold and allowed to cool to room temperature. From the white solid obtained a portion was removed, weighed into an open aluminum dish and set in the hood. At intervals these samples were weighed and from the weight loss observed, the remaining solution in the sample calculated, thus providing a measure of the active life of the composition. Data from these tests are tabulated below.

*Insecticidal compositions*

|  |  |  |  |  |  |  |  |
|---|---|---|---|---|---|---|---|
| n-Heptane [1] | 100 | 100 | 100 | 100 |  |  |  |
| Soltrol 170 [1] |  |  |  |  | 100 | 100 | 100 |
| Trans-polybutadiene | 14.3 | 21.5 | 28.6 |  | 12.8 | 19.3 |  |

| | Percent Solution Remaining |||||||
|---|---|---|---|---|---|---|---|
| Time, Hr.: | | | | | | | |
| 1 |  | 71.1 | 78.3 | 61.1 | 99.8 | 99.3 | 99.3 |
| 2 | 33.8 | 44.5 | 58.4 | 6.9 | 99.3 | 98.9 | 99.1 |
| 3 | 17.2 | 39.3 | 52.9 | 1.8 | 99.0 | 98.7 |  |
| 4 | 16.2 |  |  |  |  |  |  |
| 5 | 10.3 |  |  |  |  |  |  |
| 19 | 2.8 | 4.6 | 11.7 | 1.7 | 95.2 | 94.3 | 93.1 |
| 24 |  | 3.8 | 9.8 | 1.7 | 94.4 | 93.4 | 92.0 |
| 48 |  | 2.7 | 7.3 | 1.7 | 89.4 | 88.7 | 85.7 |
| 144 |  | 2.3 | 6.4 | 1.7 | 73.0 | 72.4 | 67.3 |
| 312 (13 days) |  | 2.2 | 6.2 | 1.7 | 58.6 | 57.5 | 49.2 |

[1] Containing 2 weight percent malathion. Soltrol is a trademark for isoparaffinic hydrocarbons boiling over a rather wide range, usually 200 to 700° F., preferably produced by an HF catalyzed alkylation of an isoparaffin with an olefin, as well known in the hydrocarbon synthesis art. The solvent here used boils in the range 320 to 500° F.

These data show that at room temperature activity as indicated by the increased retention of solvent is significantly increased. The improvement of retention using Soltrol solvent, because of the high boiling range of this solvent, indicates that effectiveness would be continued over a greatly lengthened period beyond that shown. The compositions, as prepared, are effective insecticides as can be determined by mere routine testing.

The products of the invention can be stored or transported in substantially vapor-proof containers or wrapping, e.g., aluminum foil, polyvinyl chloride, cellulose acetate, cellophane, Mylar (saturated polyester film), Saran (polymer of vinylidene chloride), polyvinyl alcohol, rigid polystyrene, metal cans, glass jars, bottles, and the like, capable of withstanding pressures which may be reached under the conditions of storage. Further, application of a thin coating of a substantially non-porous resinous or plastic solid material to the solidified hydrocarbon product which effectively seals the same and prevents substantially all loss of volatiles through evaporation can be employed. Coatings which are satisfactory for the purpose are commercial cellulose acetate-butyrate resins dissolved in a xylene-ketone solvent for purposes of application of the coating. Other coating materials that can be employed include cellulose nitrate-type lacquers, alkyd resins, phenolic coatings, carboxymethylcellulose, thermosetting resins such as phenol formaldehyde, melamine resins, and the like. When ready for use, the coating can be partially or totally removed from the composition as by scratching, peeling, etc.

Reasonable variation and modification are possible within the scope of the foregoing disclosure and the appended claims to the invention the essence of which is that low weathering rate solid form stable pest control compositions and method for producing the same have been provided, the method essentially comprising the admixture of a polymeric material and a hydrocarbon solution of a pest control agent, the polymeric material being of a character and used in a proportion such that, upon standing, as for example, by cooling the solution formed, the mass sets to a form stable solid which has the property of permitting the pest control ingredient therein to be active at the surface thereof.

We claim:
1. A method for the preparation of a form stable solid pest control composition which comprises dissolving at least about 5 parts by weight of a solid hydrocarbon material selected from the group consisting of solid trans-polydienes, solid poly-1-olefins, and mixtures thereof per 100 parts by weight of the total composition in a liquid hydrocarbon solvent solution of a pest control ingredient by stirring and heating and then cooling the mass thus obtained to obtain said solid.

2. A solid form stable pest control composition comprising a normally solid hydrocarbon polymeric material selected from the group consisting of solid trans-polydienes, solid poly-1-olefins and mixtures thereof, and a liquid hydrocarbon solvent solution of a pest control ingredient.

3. A solid form stable pest control composition comprising 5 to about 35 parts by weight of trans-polybutadiene per 100 parts by weight of the total composition and a hydrocarbon solvent solution of a pest control ingredient.

4. A solid form stable pest control composition comprising approximately 5 to about 35 parts by weight of a poly-1-olefin per 100 parts by weight of the total composition which has been dissolved in a liquid hydrocarbon solvent solution of a pest control ingredient.

5. A solid form stable pest control composition comprising a normally solid hydrocarbon polymeric material consisting essentially of a solid trans-polydiene, and a liquid hydrocarbon solvent solution of a pest control ingredient.

6. A solid form stable pest control composition comprising a normally solid hydrocarbon polymeric material consisting essentially of a solid poly-1-olefin, and a liquid hydrocarbon solvent solution of a pest control ingredient.

7. A solid form stable pest control composition comprising approximately 5–40 percent by weight based on the weight of the total composition of a solid trans-polydiene which has the property of solidifying liquid hydrocarbon solvent in which it has been dissolved, when the solution thus obtained is allowed to stand, and a liquid hydrocarbon solvent solution of a pest control ingredient, the composition being encased in a hydrocarbon solvent vapor-proof container.

8. A solid form stable pest control composition comprising approximately 5–40 percent by weight based on the weight of the total composition of a solid poly-1-olefin which has the property of solidifying a liquid hydrocarbon solvent which has been dissolved, when the solution thus obtained is allowed to stand, and a liquid hydrocarbon solvent solution of a pest control ingredient, the composition being encased in a hydrocarbon solvent vapor-proof container.

9. A solid form stable pest control composition comprising solid trans-polybutadiene and a liquid hydrocarbon solvent solution of a pest control ingredient.

10. A solid form stable pest control composition comprising solid polyethylene and a liquid hydrocarbon solvent solution of a pest control ingredient.

11. A solid form stable pest control composition comprising polybutadiene having a trans-configuration content greater than about 85 percent and a liquid hydrocarbon solvent solution of a pest control ingredient.

References Cited by the Examiner

UNITED STATES PATENTS

| | | |
|---|---|---|
| 2,051,840 | 8/1936 | Gerhart. |
| 2,217,322 | 10/1940 | Russell _____ 167—42 |
| 2,798,022 | 7/1957 | Yowell et al. _____ 167—42 |
| 2,802,811 | 8/1957 | Somerville _____ 167—42 |
| 2,825,721 | 3/1958 | Hogan et al. _____ 260—94.3 |
| 2,861,965 | 11/1958 | Roncoroni _____ 167—42 |
| 2,966,440 | 12/1960 | Gerolt _____ 167—42 |
| 3,050,513 | 8/1962 | Zelinski et al. _____ 260—94.3 |

FOREIGN PATENTS 519,032   11/1955   Canada.

JULIAN S. LEVITT, *Primary Examiner.*

LEWIS GOTTS, *Examiner.*